US011696130B2

United States Patent
Choi (10) Patent No.: US 11,696,130 B2
(45) Date of Patent: Jul. 4, 2023

(54) MOBILE PHONE AUTHENTICATION METHOD USING IMPLICIT AUTHENTICATION

(71) Applicant: FOUNDATION OF SOONGSIL UNIVERSITY-INDUSTRY COOPERATION, Seoul (KR)

(72) Inventor: Dae Seon Choi, Daejeon (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 298 days.

(21) Appl. No.: 17/256,230

(22) PCT Filed: Dec. 31, 2018

(86) PCT No.: PCT/KR2018/016966
§ 371 (c)(1),
(2) Date: Dec. 28, 2020

(87) PCT Pub. No.: WO2020/111377
PCT Pub. Date: Jun. 4, 2020

(65) Prior Publication Data
US 2021/0266740 A1    Aug. 26, 2021

(30) Foreign Application Priority Data

Nov. 27, 2018 (KR) .................. 10-2018-0148513

(51) Int. Cl.
*H04W 12/06* (2021.01)
*G06N 20/00* (2019.01)
(Continued)

(52) U.S. Cl.
CPC ............ *H04W 12/06* (2013.01); *G06N 20/00* (2019.01); *H04W 4/025* (2013.01); *H04W 12/63* (2021.01); *H04W 12/65* (2021.01); *H04W 12/68* (2021.01)

(58) Field of Classification Search
CPC ..... H04W 12/06; H04W 12/63; H04W 12/65; H04W 12/68; H04W 4/025
See application file for complete search history.

(56) References Cited

U.S. PATENT DOCUMENTS

| | | | |
|---|---|---|---|
| 2014/0020058 A1* | 1/2014 | White ................... | H04L 63/083 726/2 |
| 2014/0283022 A1* | 9/2014 | Beloncik ................ | G06F 21/32 726/19 |
| 2017/0227995 A1* | 8/2017 | Lee ........................ | G06N 20/00 |

FOREIGN PATENT DOCUMENTS

| | | |
|---|---|---|
| KR | 20140139451 | * 12/2004 |
| KR | 10-2013-0128089 A | 11/2013 |

(Continued)

OTHER PUBLICATIONS

Lee, Wei-Han et al., "Multi-sensor Authentication to Improve Smartphone Security", IEEE 2015 ICISSP, Feb. 9, 2015.
(Continued)

*Primary Examiner* — Lester G Kincaid
*Assistant Examiner* — Dung L Lam
(74) *Attorney, Agent, or Firm* — Stein IP, LLC (57) ABSTRACT

Provided is a mobile phone authentication method using implicit authentication, the method including the steps of: by a server, receiving behavior data and environment information data from a user terminal when a user checks an authentication number for authentication of a mobile phone user; by the server, detecting a start point of a behavior of the user for checking the authentication number by performing peak detection in the received behavior data, and storing
(Continued)

behavior data from the detected start point; and by the server, extracting feature data from the received environment information data and learning the extracted feature data to build a learning model.

7 Claims, 7 Drawing Sheets

(51) Int. Cl.
    *H04W 12/63*     (2021.01)
    *H04W 12/68*     (2021.01)
    *H04W 12/65*     (2021.01)
    *H04W 4/02*     (2018.01)

(56) References Cited

FOREIGN PATENT DOCUMENTS

| KR | 10-2014-0139451 A | | 12/2014 |
|---|---|---|---|
| KR | 10-2015-0019125 A | | 2/2015 |
| KR | 20150019125 | * | 2/2015 |

OTHER PUBLICATIONS

Llee, Wei-Han et al., "Secure Pick Up: Implicit Authentication When You Start Using the Smartphone", ACM SACMAT'17, Jun. 21, 2017.
Centeno, Mario Panetto et al., "Smartphone Continuous Authentication Using Deep Learning Autoencoders", IEEE 2017 15th PST. Aug. 28, 2017.

* cited by examiner

MOBILE PHONE AUTHENTICATION METHOD USING IMPLICIT AUTHENTICATION

TECHNICAL FIELD

This disclosure relates to a mobile phone authentication method using implicit authentication, and more particularly, to a technology for identifying and authenticating a user in mobile phone authentication using a short message service (SMS).

BACKGROUND ART

Recently, an authentication method using a mobile phone is being widely used to identify a user online, such as signing-up for a specific website, payment in an Internet shopping mall or a financial transaction through a financial institution web.

In the mobile phone authentication method, a resident registration number and a mobile phone number of a user are input into a provided authentication page, and then user authentication is performed by checking the occupancy of user's mobile phone through the input of an authentication number transmitted to the mobile phone of the user.

More specifically, when performing user authentication, the mobile phone authentication system provides an authentication page to the user through a web browser or the like, receives user information (a resident registration number, a communication company name, a mobile phone number, or the like) on the provided authentication page, and transmits the received user information to a server.

Accordingly, the server accesses a communication company server of the communication company to which the user has subscribed based on the input user information, and compares the input user information with user information such as the resident registration number and the mobile communication terminal number of the user, stored in the communication company server, to determine whether the user information matches. In this case, if it is determined that the user information is matched, a message including an authentication number according to user authentication is sent to a terminal of the user through a mobile communication network of the communication company server.

After that, if the user inputs the authentication number sent through the authentication page, user authentication is completed.

However, in the mobile phone authentication method as described above, if a person other than the legitimate user steals the mobile phone of the user and performs authentication, it is not possible to prevent the authentication by the person other than the legitimate user because there is no way to figure out this situation.

In addition, this conventional method is very vulnerable to an attack of stealing an SMS authentication by smishing or the like.

Therefore, it is suggested to installing an SMS authentication security application (APP) on the mobile phone of the user and use the application when authenticating the user, in order to prevent the mobile phone from being fraudulently used through application login and also prevent the SMS authentication number or the like from being stolen.

However, if an application is used, the user must use the application when authenticating the user, which is more cumbersome than the existing method of using an authentication page, so the method using an application is not widely used.

Meanwhile, the background art of the present disclosure is disclosed in Korean Unexamined Patent Publication No. 10-2013-0128089 (Nov. 26, 2013).

DISCLOSURE

Technical Problem

The present disclosure is designed to solve the problems of the conventional mobile phone authentication method as described above, and the present disclosure is directed to providing a mobile phone authentication method using implicit authentication, which enables a user to be identified in authentication of a mobile phone user using an implicit authentication technology.

Technical Solution

A mobile phone authentication method using implicit authentication according to an aspect of the present disclosure comprises: by a server, receiving behavior data and environment information data from a user terminal when a user checks an authentication number for authentication of a mobile phone user; by the server, detecting a start point of a behavior of the user for checking the authentication number by performing peak detection in the received behavior data, and storing behavior data from the detected start point; and by the server, extracting feature data from the received environment information data and learning the extracted feature data to build a learning model.

In the present disclosure, the behavior data may be three-axis acceleration data of the user terminal and three-axis gyro sensor data of the user terminal, sampled according to a set cycle.

In the present disclosure, the step of detecting a start point of a behavior and storing behavior data from the detected start point may include: by the server, normalizing the received behavior data; and calculating a mean value for each data in the behavior data received multiple times.

In the present disclosure, the environment information data may include at least one of device information, wireless access point (AP) information. Bluetooth information and GPS information.

In the present disclosure, in the step of extracting feature data and learning the extracted feature data to build a learning model, the server may extract the feature data by comparing the received environment information data with environment information data registered previously.

In the present disclosure, the learning model may be an auto-encoder type model.

In the present disclosure, before the step of receiving behavior data and environment information data, the method may further comprise: by the server, sending the authentication number and a request for transmission of behavior data and environment information data to the user terminal.

In the present disclosure, the behavior data may be received and stored according to each posture of the user terminal classified in advance.

A mobile phone authentication method using implicit authentication according to another aspect of the present disclosure comprises: by a server, receiving a request for authentication of a mobile phone user for a user terminal; by the server, sending an authentication number and a request for transmission of behavior data and environment information data to the user terminal; by the server, determining a posture of the user terminal by using received behavior data; by the server, detecting a start point of a behavior of the user for checking the authentication number by performing peak detection in the received behavior data; by the server, calculating a degree of accordance or discordance by comparing the behavior data from the detected start point with behavior data according to the determined posture of the mobile phone among behavior data stored in advance; by the server, calculating reliability by inputting the received environment information data to a learning model built in advance; and by the server, determining whether user authentication is successful based on the calculated degree of accordance or discordance and the calculated reliability.

In the present disclosure, the step of detecting a start point may include by the server, normalizing the received behavior data.

In the step of calculating a degree of accordance or discordance according to the present disclosure, the server may calculate the degree of accordance or discordance by using dynamic time warping.

In the step of calculating reliability according to the present disclosure, the server may extract feature data from received environment information data and calculate reliability by inputting the extracted feature data to the learning model.

Advantageous Effects

The mobile phone authentication method using implicit authentication according to the present disclosure checks whether behavior data and environment information data of the user performing authentication of a mobile phone user are matched with data of a registered user, in order to prevent the user authentication from being passed by fraudulent use of the mobile phone by a person other than the user without requiring an additional operation of the user.

BEST MODE

Hereinafter, an embodiment of a mobile phone authentication method using implicit authentication according to the present disclosure will be described with reference to the accompanying drawings. Here, the thickness of lines or the size of components shown in the drawings may be exaggerated for clarity and convenience of description. In addition, terms to be described later are defined in consideration of functions in the present disclosure and may be changed according to the intention or custom of users and operators. Therefore, these terms should be defined based on the contents throughout this specification.

Figure 1:
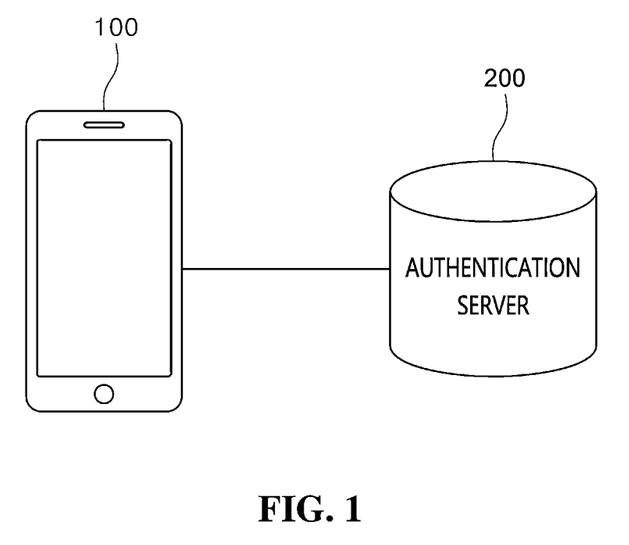
FIG. 1 is a diagram schematically showing a system in which a mobile phone authentication method using implicit authentication according to an embodiment of the present disclosure is performed.

FIG. 1 is a diagram schematically showing a system in which a mobile phone authentication method using implicit authentication according to an embodiment of the present disclosure is performed.

As shown in FIG. 1, a mobile phone authentication method using implicit authentication according to an embodiment of the present disclosure is performed by interaction between a user terminal 100 and a server 200. Here, the user terminal 100 may be a mobile phone of a user and may include a smart watch of the user terminal 100 if the mobile phone is interlocked with the smart watch. Also, the server 200 may be an authentication server that performs identification of a mobile phone user.

In addition, in the operational configuration according to the present disclosure, a website server for providing an authentication page, a communication company server for checking user authentication information, or the like may operate in connection with the above configuration.

Meanwhile, in order to perform the mobile phone authentication method using implicit authentication according to this embodiment, the user terminal 100 may be configured to transmit behavior data of the user (or, user behavior data) and environment information data to the server 200.

At this time, the user behavior data may be data output from an acceleration sensor (a sensor that measures the acceleration of the mobile phone itself) and a gyro sensor of the mobile phone. In other words, the user behavior data is data about the behavior performed by the user to check an authentication number, and in the mobile phone authentication method using implicit authentication according to this embodiment, implicit authentication is performed using a behavior pattern of the user when the user checks the authentication number. Here, the acceleration sensor and the gyro sensor of the mobile phone may be a 3-axis acceleration sensor and a 3-axis gyro sensor, respectively.

In addition, the environment information data is data about the surrounding environment where mobile phone authentication is performed and the user terminal 100, and may include device information (a brand, a manufacturer, a device model, a serial number, or the like), wireless access point (AP) information, Bluetooth information, GPS information, and the like.

The user terminal 100 may be configured to transmit the above information to the server 200 according to a request of the server 200. For example, an application (APP) for transmitting the above information may be installed at the user terminal 100, or the user terminal 100 may also be equipped with the information transmission function when being shipped.

Figure 2:
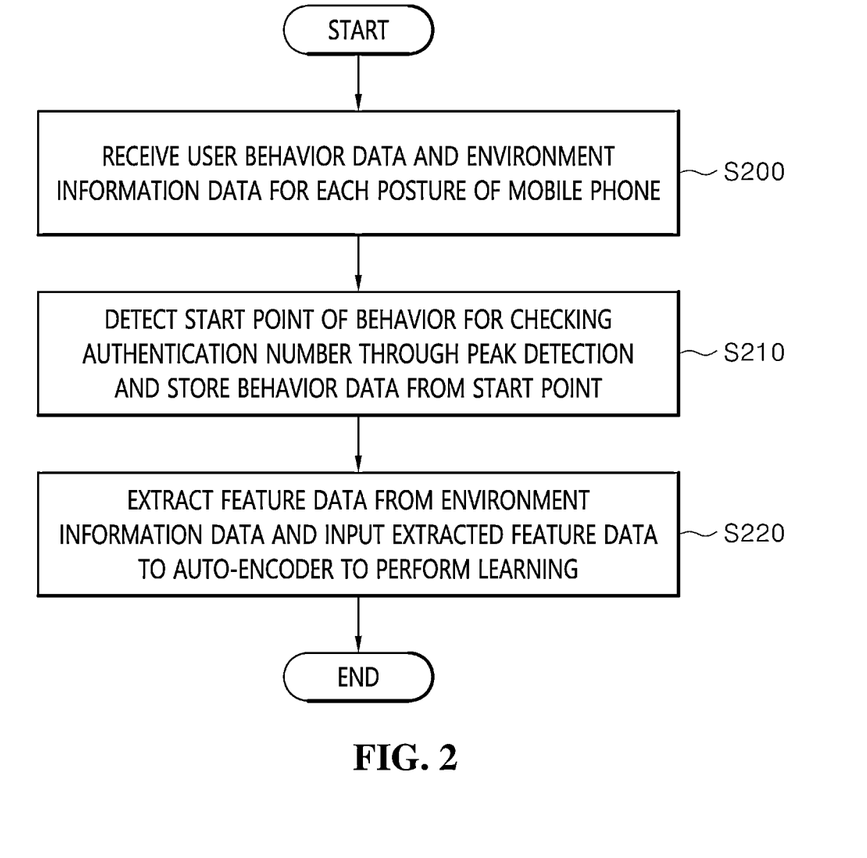
FIG. 2 is a flowchart for illustrating an authentication data construction process in the mobile phone authentication method using implicit authentication according to an embodiment of the present disclosure.
Figure 3:
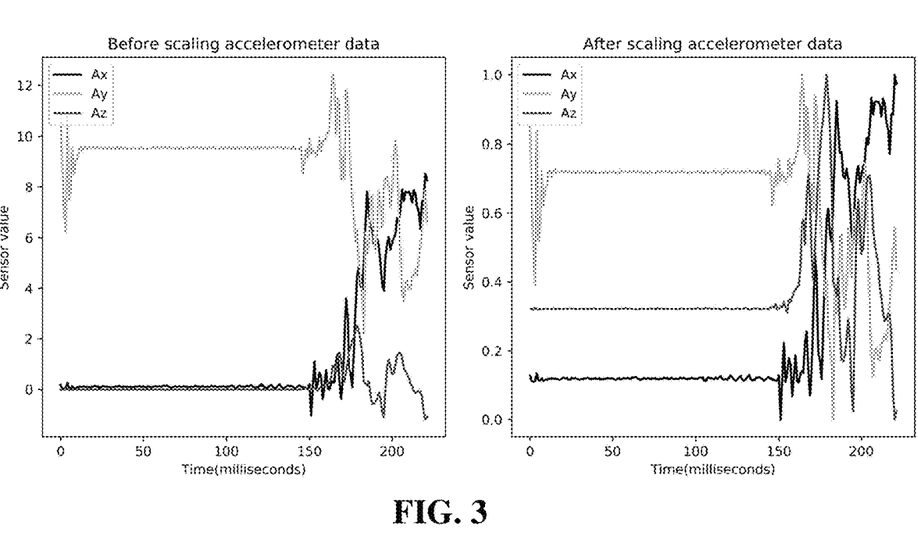
FIGS. 3 to 5 are diagrams for illustrating a behavior data registration process in the mobile phone authentication method using implicit authentication according to an embodiment of the present disclosure.
Figure 4:
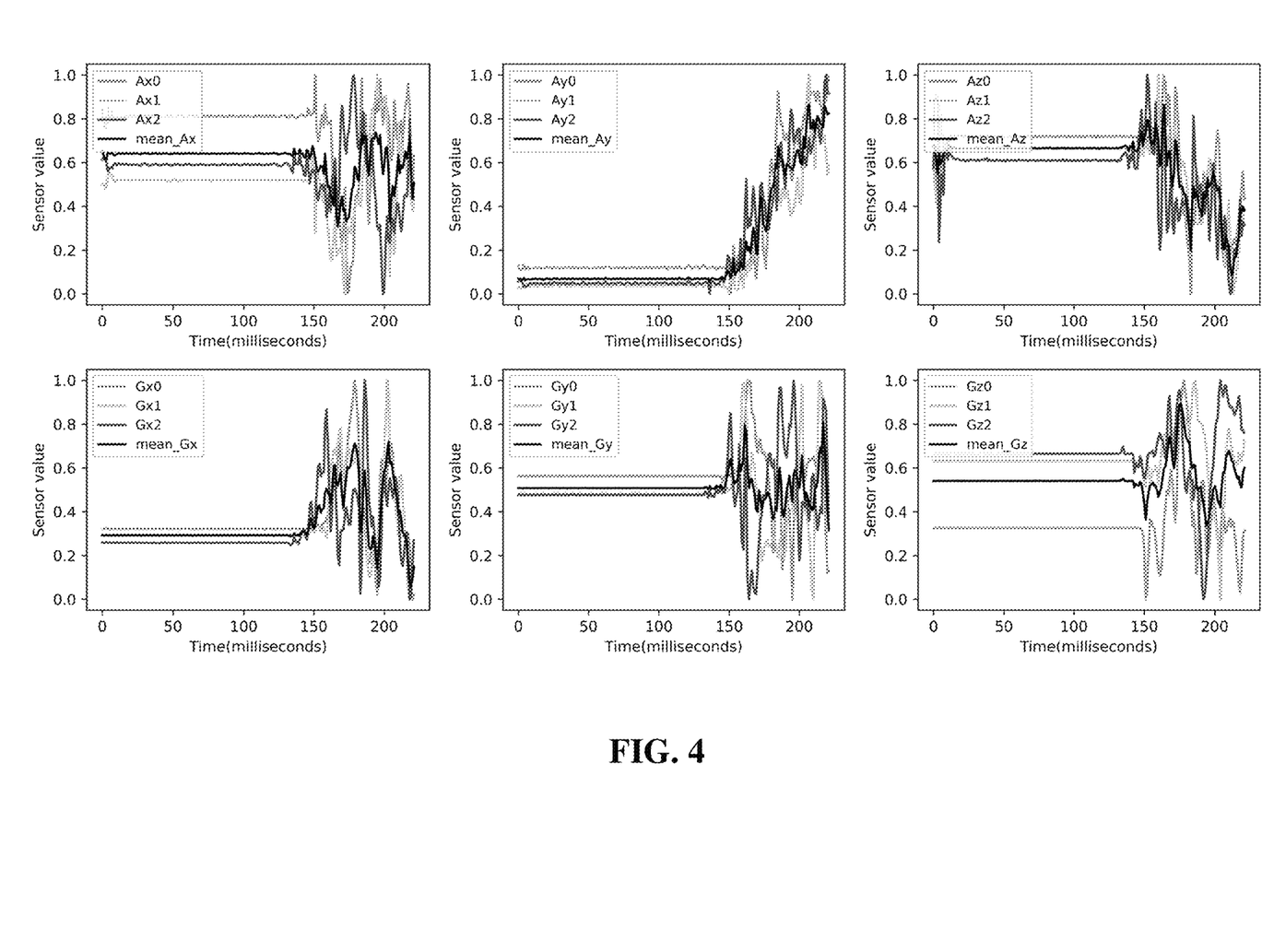
Figure 5:
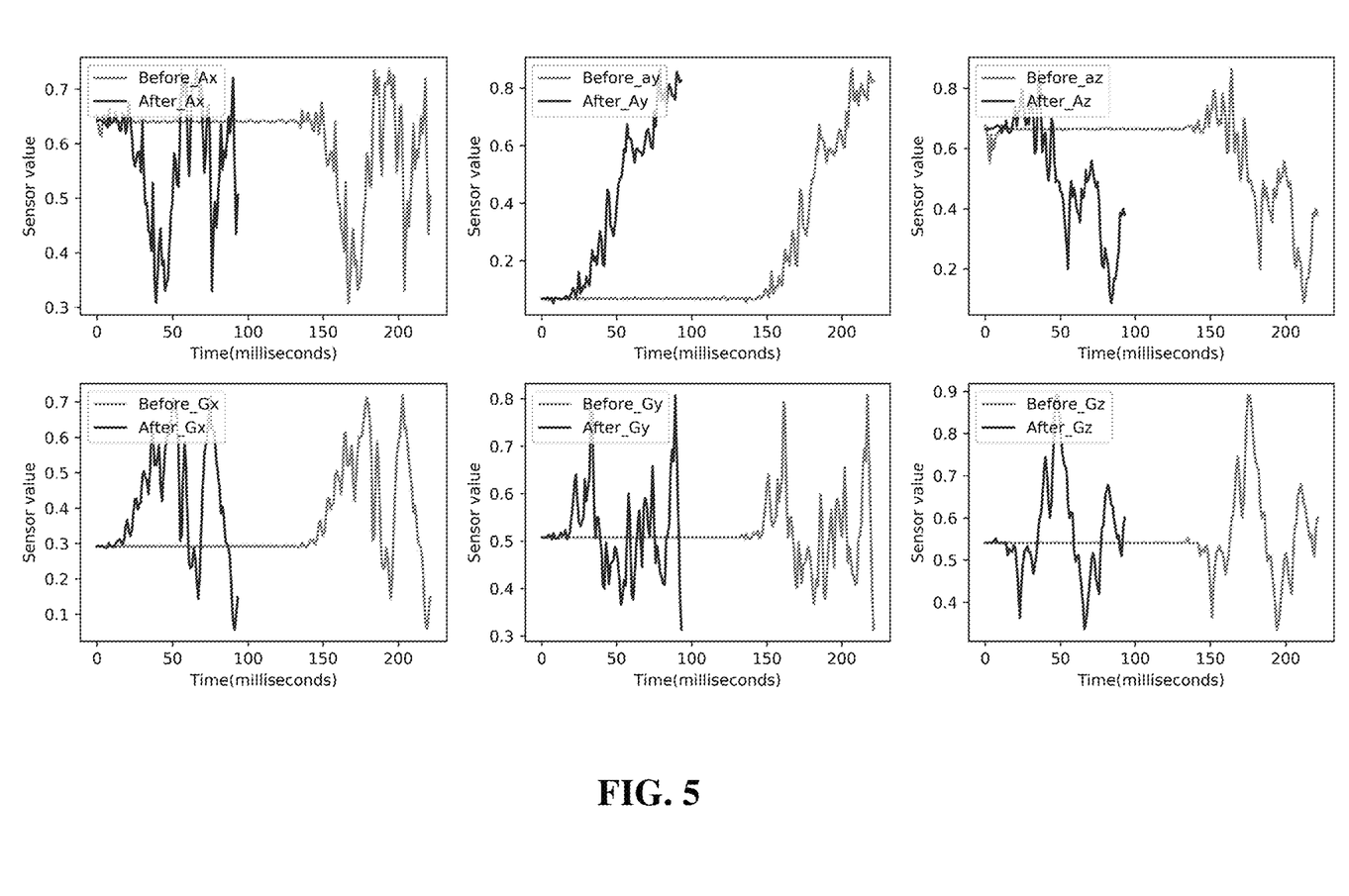
Figure 6:
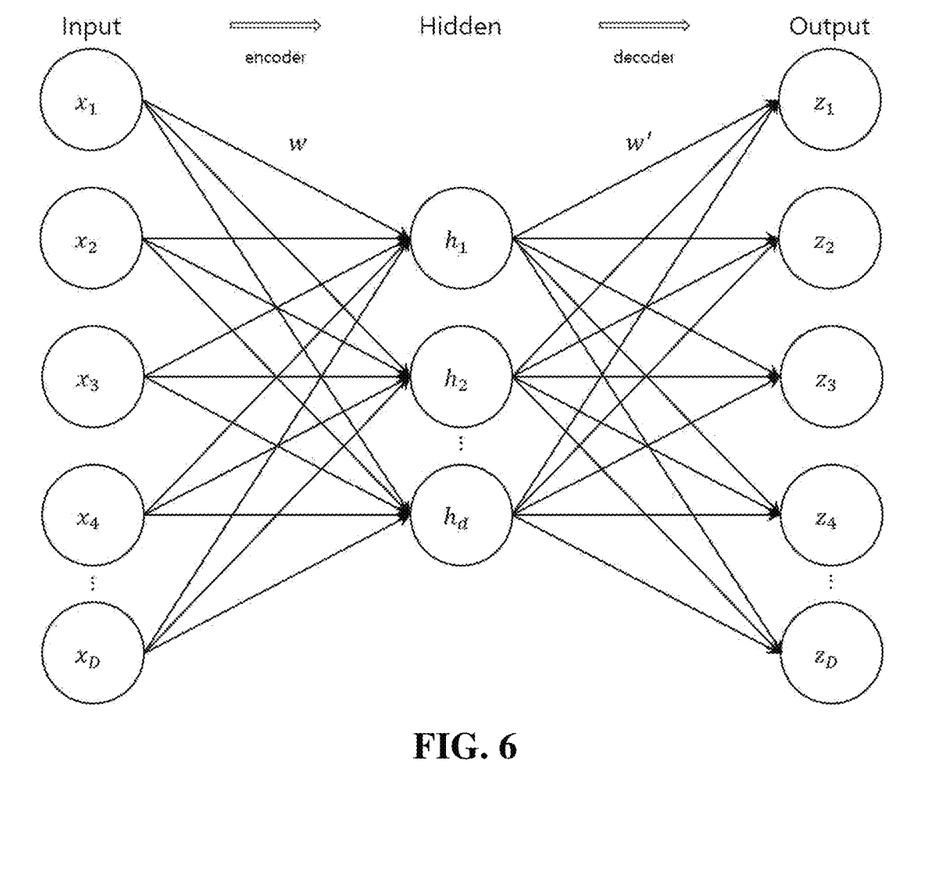
FIG. 6 is a diagram for illustrating a process of generating an environment information learning model in the mobile phone authentication method using implicit authentication according to an embodiment of the present disclosure.

FIG. 2 is a flowchart for illustrating an authentication data construction process in the mobile phone authentication method using implicit authentication according to an embodiment of the present disclosure, FIGS. 3 to 5 are diagrams for illustrating a behavior data registration process in the mobile phone authentication method using implicit authentication according to an embodiment of the present disclosure, and FIG. 6 is a diagram for illustrating a process of generating an environment information learning model in the mobile phone authentication method using implicit authentication according to an embodiment of the present disclosure. The user registration process for mobile phone will be described with reference to FIGS. 2 to 6.

In a user registration process for mobile phone authentication, the server 200 may provide a user registration webpage or the like so that an operation such as mobile phone user authentication may be performed later. That is, the user may perform user registration by entering an authentication number on a user registration webpage through an authentication number verification process, and this user registration process may be performed in the form of collecting data multiple times for each posture of the user terminal 100.

That is, in this embodiment, an acceleration sensor value and a gyro sensor value may be used as the user behavior data, and these data may be differently represented for each posture of the user terminal 100. Accordingly, in this embodiment, a plurality of postures of the user terminal 100 may be classified in advance, and the user behavior data may be registered for each posture. Here, the posture of the user terminal 100 may be classified into a case where the mobile phone is placed on an object such as a table, a case where the user is holding the mobile phone in hand, a case where the authentication process is performed through the mobile phone in the pocket of the user, or the like, and the user may proceed with user registration by performing an action according to each posture set in advance.

During the authentication process, the server 200 transmits an authentication number and a signal for requesting behavior data and environment information data to the user terminal 100, and the user may perform an action according to the designated posture of the mobile phone to check the authentication number so that user registration is performed.

Accordingly, as shown in FIG. 2, the server 200 receives user behavior data and environment information data for each posture of the mobile phone from the user terminal 100 (S200). That is, the server 200 collects behavior data and environment information data as described above for user registration.

Meanwhile, in this process, the user terminal 100 may sample data according to a preset cycle (e.g., 10 ms) and transmit the data to the server 200.

Thereafter, the server 200 detects a start point of the behavior of the user to check the authentication number through peak detection in the received behavior data, and stores the behavior data from the detected start point (S210).

This behavior data registration process will be described as follows with reference to FIGS. 3 to 5.

The server 200 may process the received data to perform data comparison and analysis, and as shown in FIG. 3, the server 200 may normalize the received behavior data first. That is, the server 200 may convert sensor data into a value between 0 and 1 by performing maximum and minimum scaling (Min Max Scaling).

In addition, as shown in FIG. 4, the server 200 may calculate a mean value for each data (x-axis, y-axis and z-axis acceleration sensor values and x-axis, y-axis and z-axis gyro sensor values) from the received behavior data (or the normalized behavior data), and perform data processing using the calculated mean value. That is, as described above, the behavior data may be received multiple times for each posture of the mobile phone, so the data may be processed through averaging.

Finally, as shown in FIG. 5, the server 200 may detect the start point of the behavior of the user to check the authentication number through peak detect in the data processed with the mean value. Here, the peak detection may be performed by detecting a point in which the rate of change of data is equal to or greater than a preset reference value, comparing a mean rate of change of data in a certain region with a reference value, or the like, and various other methods may also be used.

The server 200 may store the behavior data from the detected start point. The server 200 may set a peak point as the start point, but in order to prevent data loss related to the behavior of the user to verify the authentication number, the server 200 may also set a point before a certain number (e.g., 4) as the start point of the behavior.

Meanwhile, as described above, the behavior data may be stored for each posture of the mobile phone.

In addition, the server 200 extracts feature data from the received environment information data, and inputs the extracted feature data to an auto-encoder (AE) to perform learning (S220).

As described above, the environment information data is data about the surrounding environment where the mobile phone authentication is performed and the user terminal 100, and may include device information (a brand, a manufacturer, a device model, a serial number, or the like), wireless access point (AP) information (BSSID (MAC address of the wireless AP). RSSI (signal intensity)), Bluetooth information (MAC address, RSSI). GPS information (latitude, longitude), and the like.

The server 200 first processes the environment information data to extract feature data. For example, the server 200 may extract a character string that combines the brand, the manufacturer and the device model name, BSSID of three wireless APs with strong signal strength and RSSI thereof, Bluetooth MAC of the user terminal 100, or the like.

In addition, the server 200 may register the character string that combines the brand, the manufacturer and the device model name, the BSSID of three wireless APs with strong signal strength, the Bluetooth MAC of the user terminal 100, or the like, in order to extract feature data.

Subsequently, the server 200 extracts feature data by comparing previously registered environment information data with the newly inputted environment information data.

For example, if the character string (the character string that combines the brand, the manufacturer and the device model name) in the newly entered device information is matched with the previously registered character string, the server 200 may extract 100 as feature data, and if they are not matched, the server 200 may extract 0 as the feature data.

If the BSSID of the newly entered wireless AP is already registered. RSSI for the corresponding BSSID may be extracted as feature data, and if not registered, −100 may be extracted as feature data.

If the address of the newly entered Bluetooth MAC is already registered, RSSI for the MAC may be extracted as feature data, and if not registered, −100 may be extracted as feature data.

In addition, the latitude and longitude of the user terminal 100 may be extracted as feature data as they are.

The server 200 may configure a feature vector of the extracted environment information and learn the feature vector to generate a learning model. In this way, the server 200 may generate and store a learning model for the environment information.

That is, the server 200 may perform environment information authentication using a deep learning technique, and specifically, the server 200 may construct an auto-encoder (AE) model by learning the extracted feature vector.

The AE has a structure as shown in FIG. 6 and is a type of FNN (Feedforward Neural Network), which is a neural network that learns inherent characteristics of data. Specifically, the AE is a learning model that is trained to generate an output value similar to an input value, and the AE generates an output value with high similarity for an input value similar to the learned data, but an output value for an input value that is not similar to the learned data has low similarity.

$$h = \sigma_1(Wx+b),$$

$$z = \sigma_2(W'h+b'),$$

$$L(x,z) = \|x - \sigma_2(W'(\sigma_1(Wx+b))+b')\|^2 \quad \text{[Equation 1]}$$

The learning method of the AE may be explained using Equation 1. In Equation 1, h is a result obtained by encoding input data x through the AE, z is a result obtained by decoding h, $\sigma_1$ and $\sigma_2$ are activation functions, and L is a loss function. The learning process of the AE in this equation is a process of finding W and W' that minimizes the loss function, and if similar data are repeatedly input, W and W' corresponding to the characteristics of the data may be calculated.

In other words, if learning is performed by inputting a plurality of data with similarity, the AE outputs data with high similarity between the input value and the output value for the input value similar to the learned data, but for input values not similar to the learned data, the AE outputs data with low similarity between the input value and the output value, i.e., with high dissimilarity.

Meanwhile, for this comparison, the input environment data is registered in the server 200, and environment information input for the first time may be processed as all features are matched.

Meanwhile, in the present disclosure, the learning model may be configured to continuously learn data inputted during mobile phone authentication, explained later.

Meanwhile, in the present disclosure, the order of the step S210 and the step S220 is not fixed, so the order of the steps may be changed or both steps may be simultaneously performed in parallel.

Figure 7:
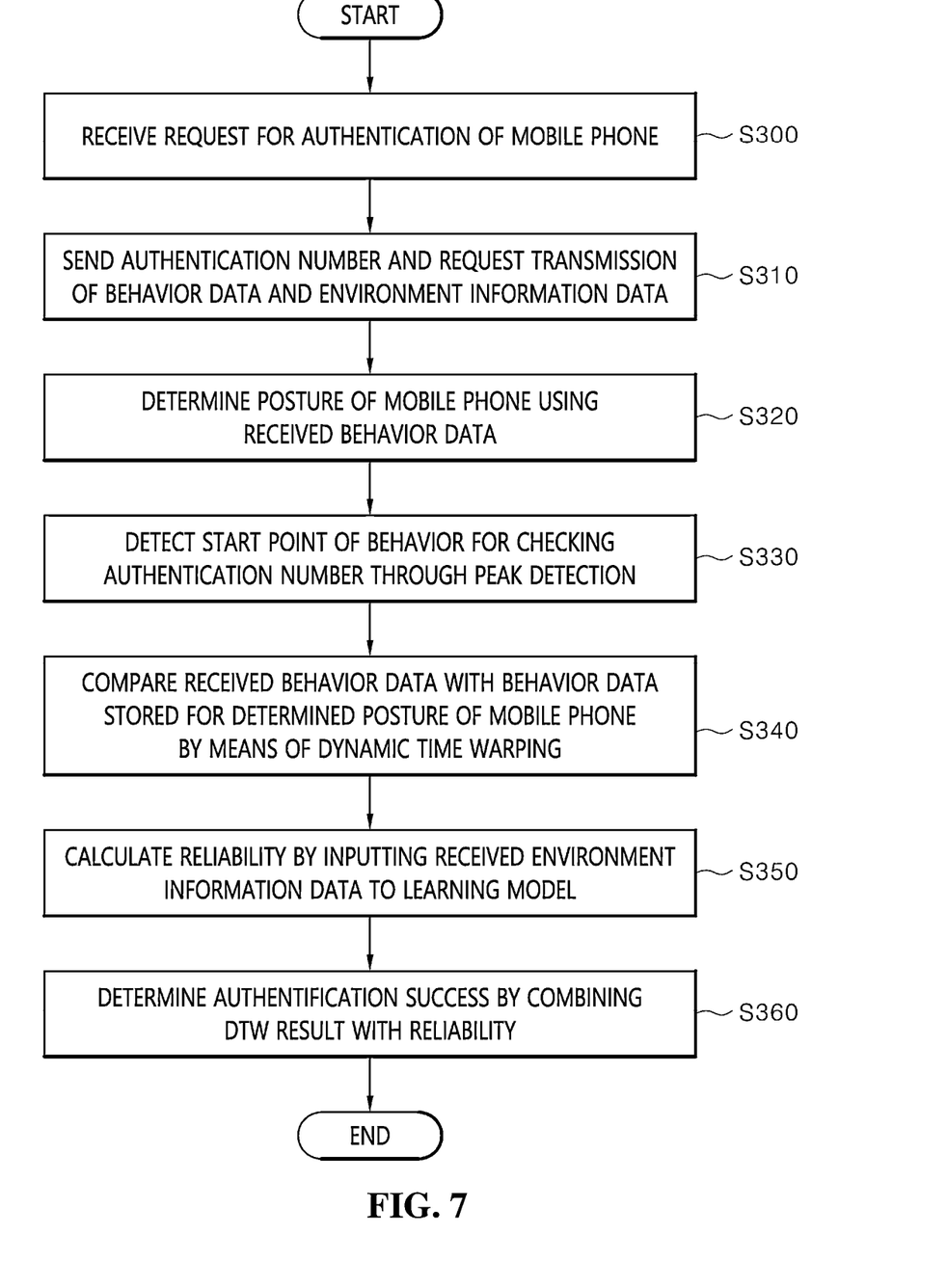
FIG. 7 is a flowchart for illustrating a mobile phone authentication method using implicit authentication according to an embodiment of the present disclosure.

FIG. 7 is a flowchart for illustrating a mobile phone authentication method using implicit authentication according to an embodiment of the present disclosure.

As shown in FIG. 7, when a request for authentication of a mobile phone for the user terminal 100 is received (S300), the server 200 sends an authentication number to the corresponding user terminal 100 and requests transmission of behavior data and environment information data (S310). That is, if there is a request for authentication of the mobile phone, the server 200 may transmit the authentication number to the user terminal 100 and also request for transmission of data required for determining whether the user is a legitimate user. At this time, the behavior data and the environment information data may be requested and received in the same manner as the user registration process of FIG. 2 described above.

Thereafter, the server 200 determines the posture of the mobile phone using the received behavior data (S320). That is, since the trend of the behavior data is shown differently according to each posture of the mobile phone, the server 200 may analyze the behavior data and determine the posture of the mobile phone as one of preset postures.

At this time, the posture may be analyzed through supervised learning machine learning using a support vector machine (SVM). The classification technology of data using SVM is already well known in the art and thus will not be described in detail here.

In addition, the server 200 detects a start point of the behavior taken by the user to check the authentication number through peak detection for the behavior data (S330).

That is, the server 200 may detect the start point of the behavior performed by the user to check the authentication number in the same manner as the step S210 described above, and for this purpose, the server 200 may perform a data normalization process.

Thereafter, the server 200 compares the received behavior data with behavior data stored for the determined posture of the mobile phone by means of dynamic time warping (DTW) (S340).

That is, the server 200 may numerically calculate the degree of accordance or discordance between both data by comparing behavior data corresponding to the determined posture of the mobile phone among behavior data stored for each posture of the mobile phone with the data after the behavior start point in the received behavior data.

For example, the server 200 may calculate the degree of accordance or discordance between both data sets by using the DTW as described above, as will be described below more specifically.

DTW starts by constructing an n-by-m matrix given when two time series data of length n and in (i.e., the stored behavior data and the received behavior data), $R = r_1, r_2, \ldots, r_i, \ldots, r_n$ and $S = s_1, s_2, \ldots, s_j, \ldots s_m$. The $(i, j)^{th}$ element of the matrix contains the distance between two points $r_i$ and $s_j$. The warping path W is defined as a contiguous set of matrices defined by the mapping between R and S. The $k^{th}$ element of W is defined as $w_k = (i, j)_k$, and $W = w_1, w_2, \ldots, w_k$ satisfying max(m, m)<=K<=(m+n+1) may be obtained. There are many warping paths that satisfy this, but a path that minimizes warping cost is used as shown in Equation 2 below.

$$DTW(R, S) = \min\left\{\sqrt{\sum_{k=1}^{K} w_k / K}\right\} \quad \text{[Equation 2]}$$

Here, K in the denominator is used to compensate for the fact that the warping path can have various lengths.

This path may be found through recurrence calculation using Equation 3 below, defining the distance d(i, j) found in a current cell and γ(i, j), which is the minimum cumulative distance of adjacent elements.

$$\gamma(i,j) = d(r_i, s_j) + \min(\gamma(i-1,j-1), \gamma(i-1,j), \gamma(i,j-1)) \quad \text{[Equation 3]}$$

In addition, the server 200 may calculate the DTW value for each data (x-axis, y-axis and z-axis acceleration sensor values and x-axis, y-axis and z-axis gyro sensor values) and calculate the sum of them. The sum calculated in this way is expressed as S_DTW.

In addition, the server 200 calculates reliability by inputting the received environment information data into the learning model (S350).

Specifically, the server 200 may calculate reliability by extracting feature data from the received environment information data and inputting the extracted feature data into the learning model built in the step S220.

At this time, the process of extracting the feature data may be the same as the above step S220.

$$\text{confidence} = 1 - \frac{loss_c}{\max(loss_e)} \quad \text{[Equation 4]}$$

This reliability may be calculated as in Equation 4, where $loss_c$ is the loss for newly entered environment data and max($loss_e$) is the maximum loss that can be obtained by inputting a feature vector, extracted when the received environment information data and registered environment information data are not entirely matched, into the user environment model.

Here, the loss may be a mean squared error of the value output from the learning model and the value input to the learning model, but it is also possible to use various values capable of representing dissimilarity between the value output from the learning model and the value input to the learning model as the loss value.

Subsequently, the server 200 determines whether the authentication is successful by combining the DTW result of the step S340 with the reliability calculated in the step S350 (S360).

That is, if the DTW result (S_DTW) of the step S340 has a large value or the reliability calculated in the step S350 has a small value, the server 200 may determine that user authentication fails, and processes as authentication failure (even if the user inputs the correct authentication number).

Specifically, for example, if the calculated value (score) is less than or equal to a predefined threshold, the server 200 may process as an authentication success, and if the calculated value (score) is larger than the predefined threshold, the server 200 may process as an authentication failure.

Meanwhile, in this embodiment, the step S320 and the step S330 may be performed simultaneously or sequentially regardless of the order, and the step S340 and the step S350 may also be performed simultaneously or sequentially regardless of the order.

The present disclosure has been described with reference to the embodiment shown in the drawings, but this is only illustrative, and it will be understood by those skilled in the art that various modifications and other equivalent embodiments can be made therefrom. Therefore, the technical protection scope of the present disclosure should be determined by the appended claims.

The invention claimed is:

1. A terminal authentication method using implicit authentication, the method comprising:
    sending, by a server, an authentication number and a request for transmission of behavior data and environment information data to the user terminal;
    by a server, receiving behavior data and environment information data from a user terminal for when a user checks an authentication number for user authentication of the user terminal;
    by the server, detecting a start point of a behavior of the user terminal for checking the authentication number by performing peak detection in the received behavior data, and storing the behavior data from the detected start point; and
    by the server, extracting feature data from the received environment information data and learning the extracted feature data to build a learning model,
    wherein the behavior data is received and stored according to each posture of the user terminal classified in advance, wherein the detecting the start point of the behavior and the storing the behavior data from the detected start point comprises:
    by the server, normalizing the received behavior data; and calculating a mean value for a plurality of the received behavior data for each posture of the user terminal;
    by the server, calculating a degree of accordance or discordance using dynamic time warping by comparing the behavior data from the detected start point with the behavior data according to the determined posture of the user terminal among behavior data stored in advance;
    wherein the calculating the degree of accordance or discordance using dynamic time warping comprises by the server, comparing the behavior data from the detected start point with a mean value for a plurality of behavior data stored in advance for the determined posture of the user terminal;
    by the server, calculating reliability by inputting the received environment information data to a learning model built in advance; and
    by the server, determining whether the user authentication is successful based on the calculated degree of accordance or discordance and the calculated reliability.

2. The terminal authentication method of claim 1, wherein the behavior data includes three-axis acceleration data of the user terminal and three-axis gyro sensor data of the user terminal, sampled according to a set cycle.

3. The terminal authentication method of claim 1, wherein the environment information data includes at least one of device information, wireless access point (AP) information, Bluetooth information, and global positioning system (GPS) information.

4. The terminal authentication method of claim 3, wherein in the extracting the feature data and learning the extracted feature data to build the learning model, the server extracts the feature data by comparing the received environment information data with environment information data registered previously.

5. The terminal authentication method of claim 1, wherein the learning model is an auto-encoder type model.

6. A terminal authentication method using implicit authentication, the method comprising:
    by a server, receiving a request for user authentication for a user terminal;
    by the server, sending an authentication number and a request for transmission of behavior data and environment information data to the user terminal;
    by the server determining a posture of the user terminal by using the received behavior data;
    by the server, detecting a start point of a behavior of the user terminal for checking the authentication number by performing peak detection in the received behavior data;
    wherein the detecting the start point comprises by the server, normalizing the received behavior data;
    by the server, calculating a degree of accordance or discordance using dynamic time warping by comparing the behavior data from the detected start point with the behavior data according to the determined posture of the user terminal among behavior data stored in advance;
    wherein the calculating the degree of accordance or discordance using dynamic time warning comprises by the server, comparing the behavior data from the detected start point with a mean value for a plurality of behavior data stored in advance for the determined posture of the user terminal;
    by the server, calculating reliability by inputting the received environment information data to a learning model built in advance; and
    by the server, determining whether the user authentication is successful based on the calculated degree of accordance or discordance and the calculated reliability.

7. The terminal authentication method of claim 6, wherein in the calculating the reliability, the server extracts feature data from the received environment information data and calculates the reliability by inputting the extracted feature data to the learning model.

\* \* \* \* \*